UNITED STATES PATENT OFFICE.

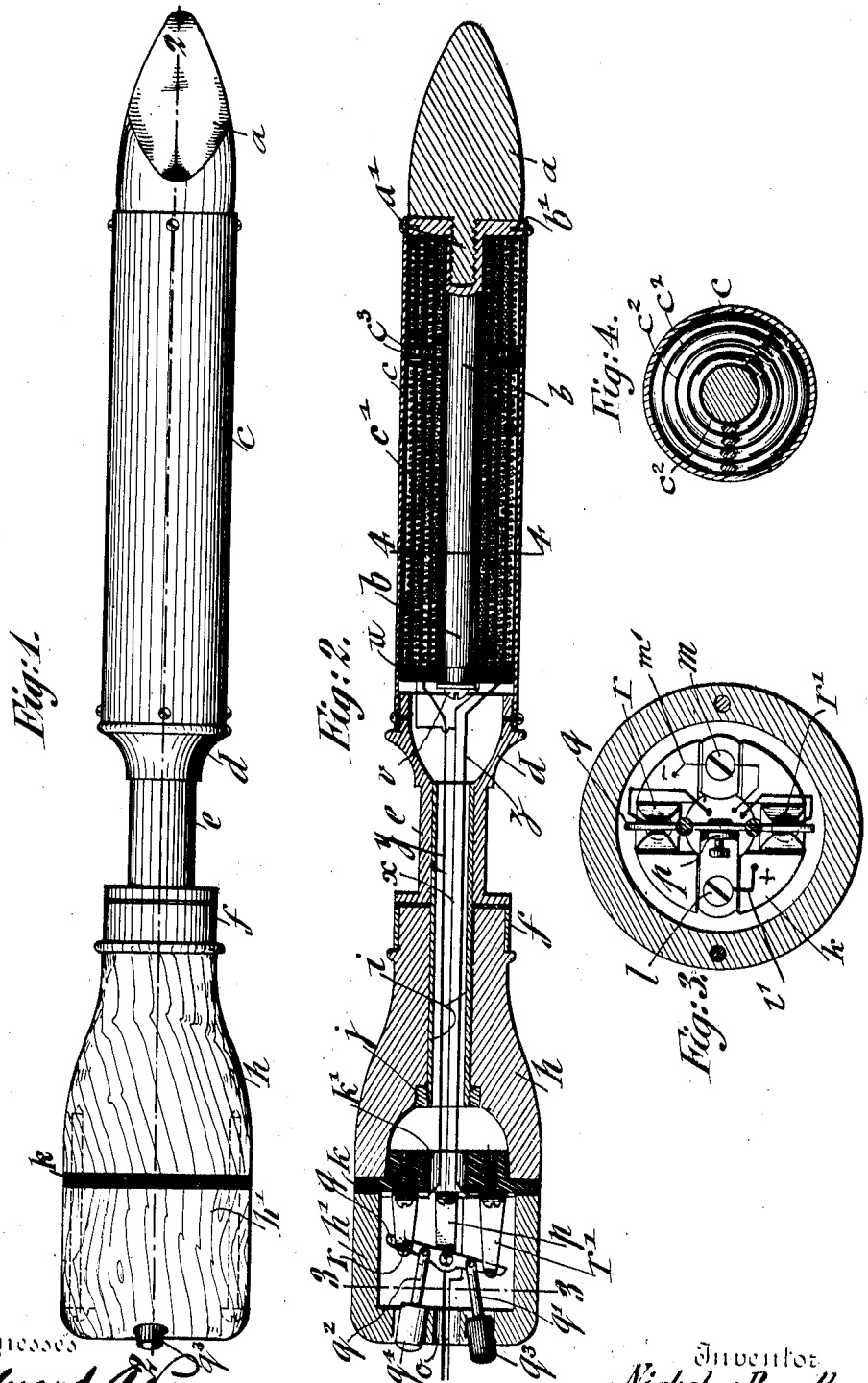

NICHOLAS PERRELLA, OF NEW YORK, N. Y.

ELECTRIC SOLDERING-TOOL.

No. 859,578.  Specification of Letters Patent.  Patented July 9, 1907.

Application filed February 20, 1906. Serial No. 302,115.

*To all whom it may concern:*

Be it known that I, NICHOLAS PERRELLA, a citizen of the United States, residing in New York, in the borough of the Bronx, county and State of New York, have invented certain new and useful Improvements in Electric Soldering-Tools, of which the following is a specification.

This invention relates to electrically-heated soldering tools, and has among its objects to provide a tool of this type which can be normally heated to a certain degree for doing ordinary work and to a higher degree for doing heavy work requiring a sustained heat of high temperature.

A further object of the invention is to provide a soldering tool in which the heating-coil is disposed in an improved manner with regard to the soldering-head, and in which said coil may be used for the purposes just indicated, namely for the heating of the tool to either of two degrees of heat.

The invention also purposes the provision of an improved switch, which can be readily operated from the handle of the tool and by which the tool may be heated to a lower heat or to a higher heat according to the work to be done.

With these and other ends in view the invention consists in a soldering tool embodying the novel features, arrangements, and combinations of parts to be hereinafter described and finally recited in the claims.

In the accompanying drawings, in which the same parts are designated by the same reference characters throughout the several views, Figure 1 is a side-elevation of a soldering tool constructed in accordance with the invention, Fig. 2 is a vertical longitudinal section of the same, Fig. 3 is a transverse section on line 3—3, Fig. 2, showing the switch and connections, and Fig. 4 is a transverse section on line 4—4, Fig. 2.

In the drawings, $a$ denotes the soldering-head, which is made of copper in the usual form and provided at its rear-portion with a threaded shank $a^1$ that engages a threaded socket in the forward end of a core $b$, preferably made of the same metal as the head $a$. The core $b$ serves for mounting the heating-coil $c^1$ thereon and has applied to its forward end, adjacent to its connection with the soldering head $a$, a disk $b^1$ to which is applied a tubular shell $c$ inclosing the heating-coil $c^1$ and attached at its rear-end, by means such as indicated, to the forward flaring end $d$ of a sleeve $e$, which in turn is connected by means of a ferrule $f$ to the forward end of a handle $h$. The handle $h$ is formed with an interior bore which débouchés into the bore of the connecting-sleeve $e$, and in said two bores is disposed a tube $i$, maintained against dislocation by a bushing $j$ in the handle. The tube $i$ serves for inclosing the electrical connecting-wires, as will be hereinafter described.

The handle $h$ is divided transversely into two portions, as indicated in Figs. 1 and 2, and the rear-portion, which is designated by the reference character $h^1$, is made hollow, as shown, in order to inclose a switch, by which electrical connection is made with the heating-coil. This switch is mounted upon an insulating-disk $k$, which is applied in any suitable manner to the rear-end of the forward handle portion and is provided with a central opening $k^1$ in alinement with the tube $i$. At diametrically-opposite points of said insulating disk $k$ are arranged binding-posts $l$ and $m$ to which are connected the conducting wires $l^1$, $m^1$ respectively. These wires are connected to any suitable source of electricity and pass through an opening $o$ in the rear-end of the handle-section $h^1$ to their respective binding-posts, $l$ and $m$.

At the center of the insulating disk $k$ is arranged an upright post $p$, to the free end of which is fulcrumed a switch-knife $q$ which is adapted to coöperate with two pairs of coöperating contact-springs $r$, $r^1$, applied to the insulating disk $k$ at diametrically-opposite points and disposed in a plane at right angles to the binding-posts $l$, $m$, as shown. For the purpose of operating the contact-knife $q$ which, as shown, is disposed within the hollow portion of the rear handle-section, said knife has connected thereto, at either side of its fulcrum two push-rods, $q^1$, $q^2$ having heads $q^3$, $q^4$ respectively, which are guided in openings in the handle-section $h^1$ at either side of the opening $o$. The heads $q^3$, $q^4$ of said two push-rods are preferably made in contrasting colors, say black and red, for the purpose to be hereinafter described.

The heating-coil $c^1$ by which heat is transmitted to the soldering head $a$, is wound in two sections on the core $b$, and consists of an inner section and an outer section, both inclosed by the shell $C$. Each section consists of two windings, as shown, the inner section having, however, four windings throughout a part of its length where it is adjacent to the head $a^1$. The inner winding is insulated from the core $b$ by a layer $c^2$ of mica or other suitable insulating material, additional insulating layers $c^3$ of mica being placed between the different windings of the inner and outer sections. The inner and outer heating-sections of the coil are preferably formed of very thin soft iron wire which will afford the required resistance to the electrical current and transmit the heat of the same to the core $b$, and, by convection, to the soldering-head $a$.

The inner end of the inner winding of the inner section of the heating-coil is connected directly with the binding-post $m$. The other end of the inner section is connected by a conducting wire $y$ with the two coöperating springs $r$. The second or outer section is a continuation of the inner section and has its outer end connected with the contact-springs $r^1$, as shown at $z$. Said section is also connected with the upright post $p$. The wires which connect the heating-coil $c^1$ with the double-acting switch are insulated by asbestos-coverings from the tube $i$ of the handle, and where said wires form connection with the heating coil they are insulated from each other by passing through a plurality of layers $u$ of mica or the like which are applied by means of a screw $v$ to the end of the core $b$. Said wires also pass through the central opening $k^1$ in the disk $k$ to their respective binding-posts and contact-springs.

The operation of the improved soldering tool is as follows: When it is desired to heat up the tool preparatory to use, the contacts $l$, $m$ are connected with a source of electricity by means of wires which pass through the opening $o$ in the rear-part of the handle. The application of wires to said contacts is facilitated by the removability of said handle-section, which, after being replaced, is preferably held in position by screws $h^1$ as indicated in dotted lines in Fig. 1. The push-rod $q^1$ is then pushed in by means of its head $q^3$, which may be readily operated by the thumb, and a connection is thereby made between the contact $l$ and the contact-springs $r^1$. From said contact-springs the current passes through the connecting wire to the outer windings of the heating coil, and from the same through the inner windings of said coil, and then back to the binding-post $m$ by means of the connections previously described. The electric current traverses both windings of the heating coil, the outer windings acting in the nature of a resistance to the inner coil so as to impart a moderate degree of heat to the core and soldering-head for doing light soldering work. When it be desired to increase the heat of the soldering-head, the action of the current is concentrated in the inner windings of the heating-coil. This is effected by pushing in the push-rod $q^2$ by its button $q^4$ so as to form an electrical connection between the binding-post $l$, switch-knife $q$, contact-springs $t$, and the inner windings of the heating coil, so that the entire current passes then through the windings of the heating coil and then out by the conducting wire of the same to the binding-post $m$. The entire strength of the current is concentrated upon the inner windings of the heating coil whereby the heating action upon the core and the soldering-head is greatly increased, so that heavy soldering work can be done by the soldering-head. When again light work has to be done the current is switched over by pressing in the button $q^3$ so as to pass again through the outer and inner windings of the heating coils which are connected in series and reduce thereby the effect of the current in the soldering-head.

It is obvious that the number and arrangement of the various windings of the heating-coil may be varied according to requirements, and that the windings included in the inner circuit, by which the soldering-head is heated to a high working heat for doing all kinds of heavy soldering work may also be differently arranged, the windings shown and described being merely by way of example for illustrating a preferred mode of winding the heating coil.

Having thus described my invention, I claim as new and desire to secure by Letters Patent:

1. In an electric soldering tool, the combination, with a core and soldering head mounted thereon at one end, of a heating coil mounted on said core and divided intermediately of its length into sections, and electrical connections with said coil whereby the current may pass through all the windings thereof or only through the windings of the section nearest said soldering head.

2. In an electric soldering tool, the combination, with a core and a head mounted thereon at one end, of a heating coil wound about said core and divided intermediately of its length into sections, of which the one nearest the soldering head includes all the inner windings of the coil, an electrical connection with said coil at the juncture of said sections, and means to form an electrical connection between the terminals of the coil or between the terminal connected with the inner windings and said electrical connection.

3. An electric soldering-tool comprising a core, a head applied to the forward end thereof, a heating-coil mounted on said core, a sheath inclosing said coil, a handle having a longitudinal bore, a sleeve connecting said handle with said sheath and having a bore alined with said first-named bore, a switch disposed interiorly of said handle, and connecting-wires leading from said switch through the bores of said handle and sleeve to said heating-coil.

4. In an electric soldering-tool, a hollow handle divided transversely into two sections, and a switch mounted in the forward section and having operating-means extending through the rear section.

5. In a tool such as described, a hollow handle divided transversely into two sections, a disk carried by one section, and a switch mounted on said disk and embodying push-rods operating in openings in the other section.

6. In an electric soldering-tool, a hollow handle divided transversely into two sections, an insulating disk carried by the rear-end of the forward section, a switch mounted on said disk and embodying an intermediately-pivoted contact-knife, and push-rods attached to said knife at either side of its pivot and operating in openings in the rear handle-section.

In testimony, that I claim the foregoing as my invention, I have signed my name in presence of two subscribing witnesses.

NICHOLAS PERRELLA.

Witnesses:
PAUL GOEPEL,
HENRY J. SUHRBIER.